United States Patent
Fedor

(10) Patent No.: US 10,216,923 B2
(45) Date of Patent: *Feb. 26, 2019

(54) DYNAMICALLY UPDATING CAPTCHA CHALLENGES

(71) Applicant: Google LLC, Mountain View, CA (US)

(72) Inventor: Jason Fedor, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,154

(22) Filed: Apr. 25, 2018

(65) Prior Publication Data

US 2018/0239893 A1  Aug. 23, 2018

Related U.S. Application Data

(63) Continuation of application No. 14/962,017, filed on Dec. 8, 2015, now Pat. No. 9,977,892.

(51) Int. Cl.
*G06F 21/45* (2013.01)
*G06F 21/36* (2013.01)
(Continued)

(52) U.S. Cl.
CPC .............. *G06F 21/45* (2013.01); *G06F 21/31* (2013.01); *G06F 21/36* (2013.01); *H04L 63/10* (2013.01); *G06F 2221/2133* (2013.01)

(58) Field of Classification Search
CPC .......... G06F 21/00; G06F 21/30; G06F 21/31; G06F 21/316; G06F 21/36; G06F 21/45;
(Continued)

(56) References Cited

U.S. PATENT DOCUMENTS

| 7,373,510 B2 | 5/2008 | Lamberton et al. |
| 8,397,275 B1 | 3/2013 | Magdsick |

(Continued)

FOREIGN PATENT DOCUMENTS

WO   WO 2015/065675   5/2015

OTHER PUBLICATIONS

Elson et al., "Asirra: A CAPTCHA that Exploits Interest-Aligned Manual Image Categorization", Proceedings of the 14th ACM Conference on Computer and Communications Security, Oct. 29-Nov. 2, 207, Alexandria, Virginia, pp. 366-374.

(Continued)

*Primary Examiner* — Eric W Shepperd
(74) *Attorney, Agent, or Firm* — Dority & Manning, P.A.

(57) ABSTRACT

Systems and methods of dynamically updating CAPTCHA challenges are provided. For instance, a request to access an online resource can be received from a user device. A verification challenge can then be provided to the user device. One or more user responses to the verification challenge can be received. Each user response can correspond to an interaction by the user with an object from the plurality of objects. One or more risk assessment scores associated with the user can be determined based at least in part on the one or more user responses. The verification challenge can then be updated based at least in part on the one or more risk assessment scores and the one or more user responses.

20 Claims, 7 Drawing Sheets

(51) Int. Cl.
*H04L 29/06* (2006.01)
*G06F 21/31* (2013.01)

(58) Field of Classification Search
CPC . G06F 2221/2133; H04L 63/08; H04L 63/10; H04L 63/12; H04L 2463/144
See application file for complete search history.

(56) References Cited

U.S. PATENT DOCUMENTS

| | | | |
|---|---|---|---|
| 8,494,854 B2 * | 7/2013 | Gross | G10L 15/22 704/246 |
| 8,621,578 B1 | 12/2013 | Blomquist et al. | |
| 8,752,141 B2 | 6/2014 | Gross | |
| 8,904,493 B1 | 12/2014 | Dibble | |
| 8,918,851 B1 | 12/2014 | Iannamico | |
| 8,978,121 B2 | 3/2015 | Shuster | |
| 9,396,332 B2 * | 7/2016 | Abrams | G06F 21/554 |
| 9,411,950 B1 | 8/2016 | Olsen-Kreusch | |
| 9,501,630 B2 * | 11/2016 | Paxton | G06F 21/316 |
| 2006/0294390 A1 | 12/2006 | Navratil et al. | |
| 2007/0277224 A1 | 11/2007 | Osborn et al. | |
| 2008/0222417 A1 | 9/2008 | Downes et al. | |
| 2009/0063437 A1 * | 3/2009 | Hendrey | H04L 63/0807 |
| 2009/0113294 A1 | 4/2009 | Sanghavi et al. | |
| 2009/0235327 A1 | 9/2009 | Jakobsson et al. | |
| 2010/0036783 A1 | 2/2010 | Rodriguez | |
| 2011/0081640 A1 | 4/2011 | Tseng et al. | |
| 2012/0166409 A1 | 6/2012 | Saxena et al. | |
| 2012/0323700 A1 | 12/2012 | Aleksandrovich et al. | |
| 2013/0042311 A1 | 2/2013 | Broder et al. | |
| 2013/0276125 A1 | 10/2013 | Bailey | |
| 2014/0067474 A1 | 3/2014 | Deo et al. | |
| 2014/0130126 A1 | 5/2014 | Jakobsson | |
| 2015/0269387 A1 | 9/2015 | Cannarsa | |
| 2015/0310686 A1 | 10/2015 | Backert et al. | |
| 2015/0365401 A1 | 12/2015 | Brown et al. | |
| 2016/0028730 A1 | 1/2016 | Natarajan et al. | |
| 2016/0241592 A1 | 8/2016 | Kurkure et al. | |
| 2017/0078319 A1 | 3/2017 | Thompson | |
| 2017/0109754 A1 | 4/2017 | Hanna | |

OTHER PUBLICATIONS

International Search Report and Written Opinion for PCT/US2016/064070 dated Feb. 20, 2017, 13 pages.
Yu et al., "Automatic Generation of Game-Based CAPTCHAs", The Sixth Workshop on Procedural Content Generation, Jun. 22-25, 2015, Pacific Grove, California, 4 pages.

* cited by examiner

DYNAMICALLY UPDATING CAPTCHA CHALLENGES

The present disclosure is a continuation of U.S. application Ser. No. 14/962,017 having a filing date of Dec. 8, 2015. Applicants claim priority to and benefit from U.S. application Ser. No. 14/962,017 which is incorporated by reference herein.

FIELD

The present disclosure relates generally to CAPTCHA challenges, and more particularly to updating a CAPTCHA challenge based at least in part on one or more user response to the CAPTCHA Challenge.

BACKGROUND

Trust is an asset in web-based interactions. For example, a user must trust that an entity provides sufficient mechanisms to confirm and protect her identity or other confidential information in order for the user to feel comfortable interacting with such entity. Further, an entity that provides a web-resource must be able to block automated attacks that attempt to gain access to the web-resource for malicious purposes. Thus, sophisticated authentication mechanisms that can discern between a resource request originating from a human being and a request generated by an automated machine are a vital tool in ensuring that web-resources are protected from automated attacks and developing the necessary relationship of trust between a resource provider and a user.

CAPTCHA systems ("completely automated public Turing test to tell computers and humans apart") can provide such an authentication mechanism. One goal of a CAPTCHA system is to exploit situations in which it is known that humans perform tasks better than automated machines. Thus, as part of a verification process, CAPTCHA systems can provide a challenge that is solvable by a human but generally unsolvable by a machine.

In some instances, illegitimate human users, such as CAPTCHA farmers may attempt to solve a plurality of CAPTCHA challenges and to provide the solutions to the CAPTCHA challenges to one or more "bots," such that the bots may gain access to a plurality of web-resources. In such instances, it can be difficult to distinguish an illegitimate human user such as a CAPTCHA farmer from a legitimate human user.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of dynamically updating a verification challenge. The method includes receiving, by one or more computing devices, a request to access an online resource from a user device. The method further includes, responsive to receiving the request to access the online resource, providing, by the one or more computing devices, a verification challenge to the user device. The verification challenge comprises a plurality of objects and one or more instructions prompting a user of the user device to interact with at least one object of the plurality of objects. The method further includes receiving, by the one or more computing devices, one or more user responses to the verification challenge. Each user response corresponds to an interaction by the user with an object from the plurality of objects. The method further includes determining, by the one or more computing devices, one or more risk assessment scores associated with a user of the user device based at least in part on the one or more user responses. The method further includes, responsive to each of the one or more user responses, updating, by the one or more computing devices, the verification challenge based at least in part on the one or more risk assessment scores and the one or more user responses.

Other example aspects of the present disclosure are directed to systems, apparatus, tangible, non-transitory computer-readable media, user interfaces, memory devices, and electronic devices for providing CAPTCHA challenges to a user.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
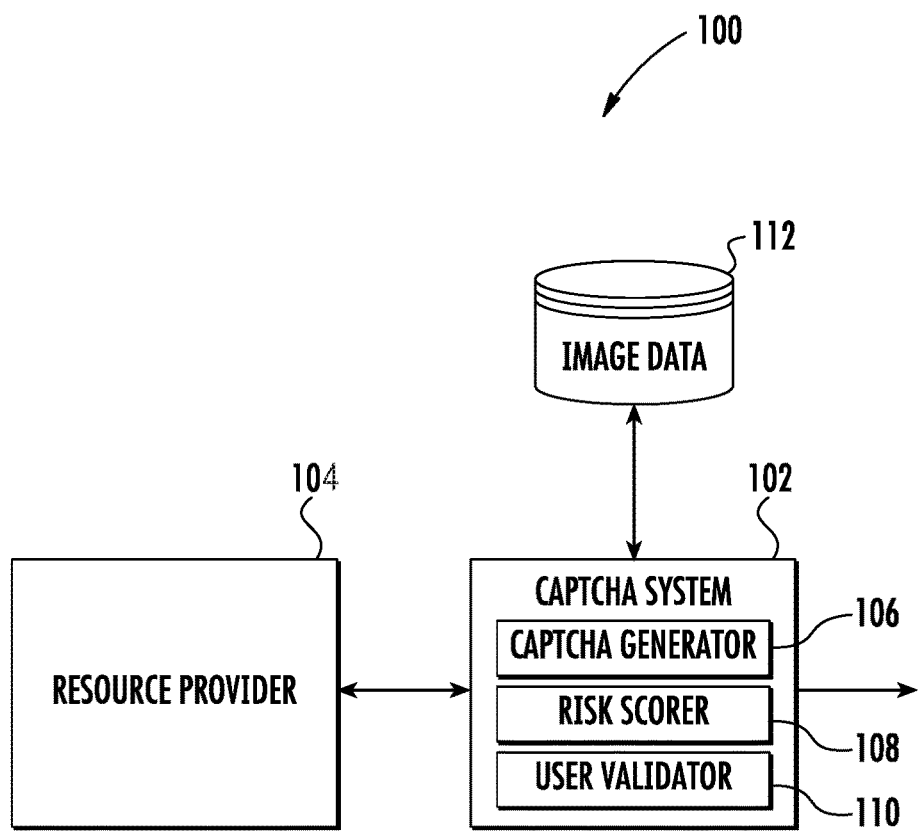
FIG. 1 depicts an overview of an example system for providing a CAPTCHA challenge to a user according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to dynamically updating a verification challenge. For instance, a verification challenge can be provided to a user device in response to a verification request from the user device. The verification challenge can include a plurality of objects, and one or more instructions prompting a user of the user device to interact with at least one object of the plurality of objects in a specified manner. One or more user responses to the verification challenge can be received. Each user response can correspond to a user interaction with an object. A risk assessment score can then be determined based at least in part on the one or more user responses. The verification challenge can be updated responsive to each user response, and the update can be based at least in part on the risk assessment score and the one or more user responses.

For instance, a user can attempt to access an online service or resource using a user device, such as a smartphone. In response to the attempt, the user may be presented with a verification challenge that includes a plurality of images and instructions prompting the user to select each image that meets a specified criterion (see e.g., FIG. 2). The user may input a response to verification challenge by selecting an image. A risk assessment score associated with the user can be determined based at least in part on the user response. The selected image in the verification challenge can be replaced by a replacement image based at least in part on the risk assessment score, and the replacement image can be provided to the user as part of an updated verification challenge. The replacement image may or may not meet the specified criterion. The user can then input a second user response to the updated verification challenge by selecting a second image, and an updated risk assessment score can be determined based at least in part on the second response. The second selected image can then be replaced by a replacement image based at least in part on the updated risk assessment score, and provided to the user as part of an update to the verification challenge. This process can repeat until there are no longer any images that meet the criterion presented to the user in the verification challenge. A determination can then be made whether to grant the user access to the online resource based at least in part on the user responses and/or the risk assessment scores associated with the user.

As used herein, a user device can be a laptop computer, desktop computer, smartphone, tablet, wearable computing device, or any other suitable user computing device. As indicated, in order to access the online service, a user can first be required to solve a verification challenge. For instance, the verification challenge can be a completely automated public Turing test to tell computers and humans apart (CAPTCHA) challenge provided by a computerized CAPTCHA system to verify the legitimate human status of the user, thereby preventing "bots" from damaging the online service. For instance, the CAPTCHA system can provide a CAPTCHA challenge to the user, and the user can gain access to the online service if the user "passes" the challenge. In some implementations, the verification challenge can be an image based challenge including instructions prompting the user to solve the challenge through interaction with one or more images.

In some implementations, the plurality of objects can include a plurality of images. In such implementations, the CAPTCHA challenge can further include instructions prompting the user to select or otherwise interact with each image from the plurality of images that meets a specified criterion. For instance, the instructions may prompt a user to select each image that depicts a particular item, object, human, animal, etc. In this manner, the CAPTCHA challenge may include a plurality of images that includes a first subset of images that meet the criterion, and a second subset of images that do not meet the criterion.

In some implementations, the CAPTCHA challenge can include multiple rounds or iterations. In this manner, each round can correspond to a single user response. In some implementations, each user response (e.g. each user selection of an image) can be communicated to a remote computing device (e.g. a server device). Responsive to each user response, a risk assessment score can be determined or updated. In particular, the risk assessment score can be determined for a user or user device operated by the user. For instance, the risk assessment score can correspond to a measure of likelihood that the user or user device is associated with an illegitimate human CAPTCHA user, such as a "CAPTCHA farmer" or other illegitimate human user. In some implementations, the risk assessment score can be determined based at least in part on user device type, one or more user device capabilities, an Internet Protocol address associated with the user device, a user web-history, or whether the user participates in various other web-services. In some implementations, the risk assessment score can be determined based at least in part on a percentage of correct responses by the user to the verification challenge, and/or a length of time taken for a user response to be received.

The verification challenge can be updated based at least in part on the risk assessment scores. In some implementations, each update to the verification challenge can correspond to an additional round or iteration of the verification challenge. For instance, the verification challenge can be updated responsive to each user response and/or each determined or updated risk assessment score.

In some implementations, updating the verification challenge can include replacing an image selected by the user with a replacement image. The replacement image may meet the specified criterion or may not meet the specified criterion. The replacement image can be determined or otherwise selected based at least in part on the risk assessment score(s). For instance, a replacement image that meets the specified criterion can be selected when the risk assessment score is greater than a threshold score, and a replacement image that does not meet the criterion can be selected when the risk assessment score is less than the threshold score. In this manner, for each user response (e.g. selected image), a risk assessment score can be determined based at least in part on the user response, and the selected image can be replaced by a replacement image that is determined or selected based at least in part on the risk assessment score.

In some implementations, an initial risk assessment score can be determined based at least in part on the initial user response. The risk assessment score can then be updated based at least in part on one or more subsequent user responses. In this manner, the replacement image associated with each round or iteration of the verification challenge can be determined based at least in part on the initial or updated risk assessment score associated with that round of the verification challenge.

The response(s) from the user can be used to determine whether access to the online service should be granted to the user device. For instance, if the response satisfactorily completes or solves the verification challenge, then the computerized CAPTCHA system can verify the user device. For instance, in implementations wherein the instructions associated with the verification challenge prompt the user to select each image that meets a specified criterion, the user can "pass" the verification challenge when there are no longer any images to select that meet the criterion. In such implementations, the user can "pass" the verification challenge when each selected image that meets the criterion is replaced with a replacement image that does not meet the criterion. In this manner, the number of iterations or rounds required to satisfactorily complete or solve the verification challenge can be determined based at least in part on the risk assessment score(s) and/or the replacement images.

As indicated above, CAPTCHA farmers may attempt to provide answers to verification challenges to a "bot" by forwarding data indicative of the answers to a remote computing device associated with the bot. Updating the verification challenge to include multiple rounds of communication can result in increased difficulty for a suspected CAPTCHA farmer in providing the answers to the bot. For instance, being able to dynamically adjust the number of user selections and/or rounds required to sufficiently solve the verification challenge can increase the time and/or communication iterations required to relay the answer to the bot. In this manner, the number of rounds required to sufficiently solve the verification challenge can be determined based at least in part on the suspected likelihood that the user is a CAPTCHA farmer (e.g. based at least in part on the risk assessment score).

As an example, once the computerized CAPTCHA system has been sufficiently convinced that the user device is operated by a legitimate human user (e.g. based on the response(s) to the verification challenge), the computerized CAPTCHA system can provide a verification token or certificate to the user computing device. The user computing device can then provide the verification token to a resource provider associated with the online service. In turn, the resource provider can confirm the validity of the verification token with the computerized CAPTCHA system. Upon confirmation of token validity, the resource provider can provide the resource to the user device.

With reference now to the figures, example aspects of the present disclosure will be discussed in more detail. For instance, FIG. 1 depicts an overview of an example system 100 for providing CAPTCHA challenges to a user device. In particular, system 100 can include a computerized CAPTCHA system 102 and a resource provider 104. CAPTCHA system 102 can be implemented using one or more computing devices, such as, for example, one or more servers. In particular, any computing tasks performed by CAPTCHA system 102 can be performed by any combination of one or more computing devices connected in a parallel or distributed computing system.

CAPTCHA system 102 can include a CAPTCHA generator 106 configured to receive a request to engage in a verification process from a user device, and select and provide a CAPTCHA challenge to the user device. For instance, the request to engage in the verification process can correspond to a request by the user to access an online service or resource from resource provider 104. Non-limiting examples of an online resource or service include a cloud-based email client, a social media account or content, software as a service, an online auction interface, a financial services account, an online game, a data library, a code library, an arbitrary web-service, or any other suitable resource. In some implementations, the CAPTCHA challenge can be an image based CAPTCHA challenge having a plurality of images and associated instructions prompting a user of the user device to select or otherwise interact with one or more of the images. In particular, the instructions can prompt the user to select or interact with each presented image that meets a specified criterion. For instance, the instructions may prompt a user to select each image that depicts a particular object, item, human, animal, etc.

As indicated above, CAPTCHA generator 106 can further be configured to update the CAPTCHA challenge based at least in part on one or more risk assessment scores associated with the user. For instance, the CAPTCHA challenge may require multiple user responses to sufficiently solve the CAPTCHA challenge. The CAPTCHA challenge can be updated responsive to one or more of the user responses. In this manner, CAPTCHA system 100 can further include a risk scorer 108. Risk scorer 108 can be configured to obtain one or more signals associated with the user and/or the user device and to determine a risk assessment score based at least in part on the obtained signals. In some implementations, the risk assessment score can be updated after each user response to the verification challenge.

CAPTCHA generator 106 can update the CAPTCHA challenge based at least in part on the determined or updated risk assessment score(s). For instance, in some implementations, updating the CAPTCHA challenge can include replacing an image selected by the user with a replacement image. As indicated above, the replacement image can be determined based at least in part on the risk assessment score(s). For instance, CAPTCHA generator 106 can access an image database 112 to select the replacement image(s).

In some implementations, each user response (e.g. each selection of an image by the user) can correspond to a round of communication between the user device and CAPTCHA system 102. For instance, the user device can provide each user response to CAPTCHA system 102, and, in response, CAPTCHA system 102 can provide an updated CAPTCHA challenge to the user device. In such implementations, the number of images and/or replacement images that meet the criterion specified in the instructions can determine the number of user selections and/or rounds of communication required to sufficiently solve the challenge and to validate the user.

CAPTCHA system 102 can further include a user validator 110 configured to determine whether the user has sufficiently solved the CAPTCHA challenge, and thereby to determine whether to grant the user access to the online service or resource. For instance, in some implementations, once it has been determined to grant the user access, user validator 110 can be configured to generate and provide a verification token to the user device and receive and validate a verification token for resource provider 104.

Furthermore, while CAPTCHA generator 106, risk scorer 108, and user validator 110 are depicted in FIG. 1 as separate modules or components of CAPTCHA system 102, in some implementations such modules can be combined to form a single module or distributed to form several additional modules.

Figure 2:
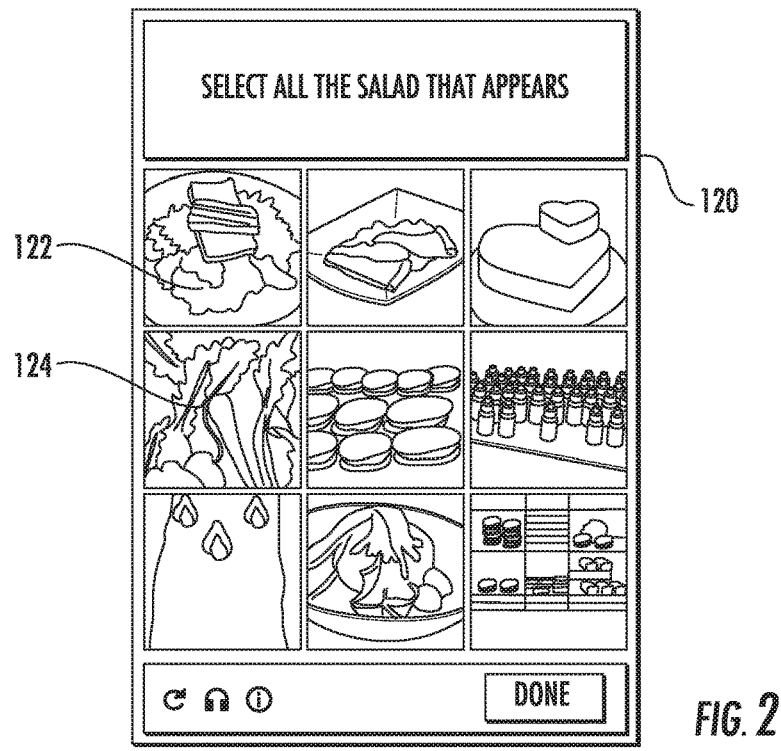
FIGS. 2-5 depict example CAPTCHA challenges according to example embodiments of the present disclosure.
Figure 3:
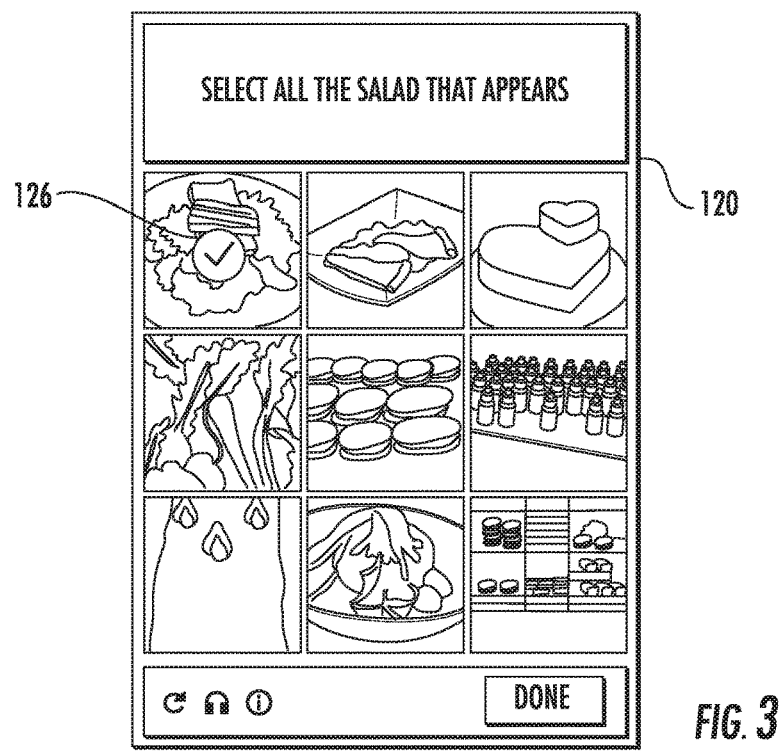
Figure 4:
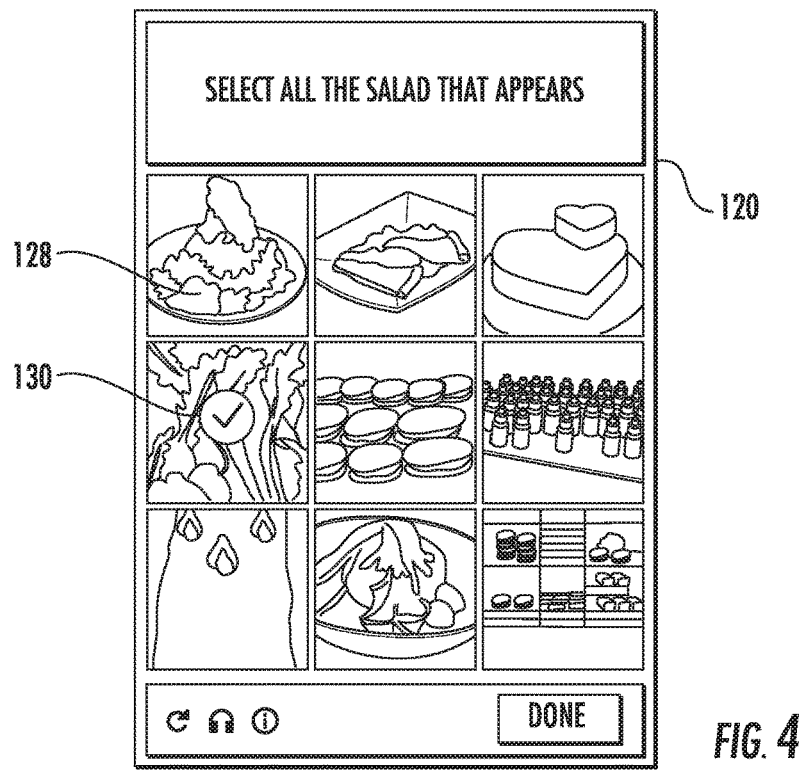

FIGS. 2-5 depict an example CAPTCHA challenge according to example embodiments of the present disclosure. For instance, FIG. 2 depicts CAPTCHA challenge 120. CAPTCHA challenge 120 includes a plurality of images, and instructions prompting a user to "select all the salad that appears." As shown, images 122 and 124 depict salads, while the rest of the images do not depict salads. A user can provide one or more responses to the CAPTCHA challenge. For instance, in FIG. 3, checkmark 126 indicates that the user has selected image 122. In some implementations, this user response can be provided to a remote computing device (e.g. server), and the remote computing device can update CAPTCHA challenge 120 based at least in part on the user selection of image 122. The update to CAPTCHA challenge 120 can include replacing image 122 with a replacement image, such as replacement image 128. As shown, replacement image 128 also depicts a salad. FIG. 4 further depicts a checkmark 130 indicative of a user selection of image 124.

Figure 5:
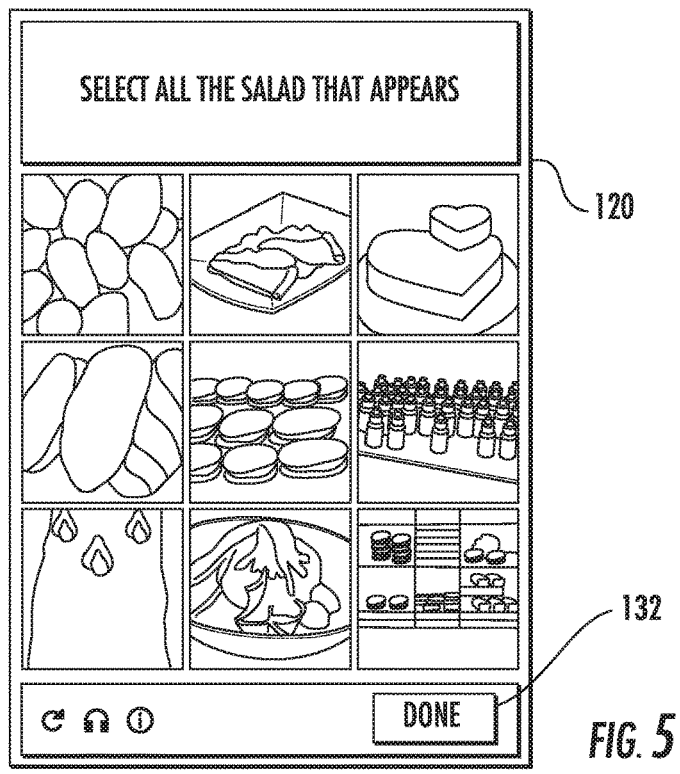

In this manner, the user can continue to make selections until each image that depicts salad is replaced by an image that does not depict salad, such that there are no images that depict salad presented to the user. For instance, FIG. 5 depicts an updated CAPTCHA challenge 120 wherein each image that depicts salad has been replaced by an image that does not depict salad. Once there are no images left that meet the specified criterion, the user can select the verification box 132. Responsive to the user selection of verification box 132, it can be determined whether to grant the user access to the desired resource or service. For instance, the determination can be based at least in part on the number of correct user responses, the number of presented images that depicted salad, and/or one or more risk assessment score(s) associated with the user.

Figure 6:
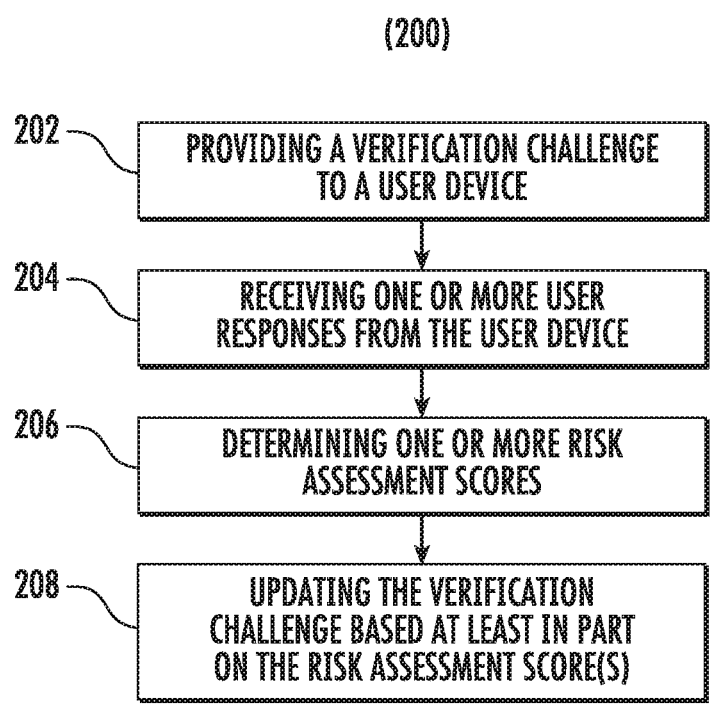
FIG. 6 depicts a flow diagram of an example method of providing a verification challenge to a user according to example embodiments of the present disclosure.

FIG. 6 depicts a flow diagram of an example method (200) of providing a verification challenge to a user according to example embodiments of the present disclosure. Method (200) can be implemented by one or more computing devices, such as one or more of the computing devices depicted in FIG. 9. In particular implementations, various aspects of the method (200) can be implemented by the CAPTCHA system 102 in FIG. 1. In addition, FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include providing a verification challenge to a user device. As indicated, the verification challenge can include one or more objects, and associated instructions prompting the user to interact with the one or more objects in a specified manner. At (204), method (200) can include receiving one or more user responses from the user device. For instance, each user response can be indicative of an interaction by the user with an object of the verification challenge.

At (206), method (200) can include determining one or more risk assessment scores based at least in part on the user response(s). For instance, In some implementations, the risk assessment score can be determined based at least in part on user device type, one or more user device capabilities, an Internet Protocol address associated with the user device, a user web-history, and/or whether the user participates in various other web-services. In some implementations, the risk assessment score can be determined based at least in part on a percentage of correct responses by the user to the verification challenge, and/or a length of time taken for a user response to be received.

In some implementations, a risk assessment score can be determined for each user response. For instance, as will be described in more detail below with regard to FIG. 7, an initial risk assessment score can be determined responsive to the first user response, and one or more updated risk assessment scores can be determined responsive to one or more subsequent user responses. In this manner, each risk assessment score can correspond to a user response.

In some implementations, a risk assessment score can be determined prior to providing the verification challenge to the user device. In this manner, the verification challenge can be selected and/or generated based at least in part on the risk assessment score. For instance, in implementations wherein the verification challenge includes a plurality of images and instructions prompting the user to select each image that meets a specified criterion, the number of images that meet the criterion can be determined based at least in part on the risk assessment score.

At (208), method (200) can include updating the verification challenge based at least in part on the risk assessment score(s). For instance, in implementations wherein a risk assessment score is determined or updated for each user response, the verification challenge can be updated based at least in part on each updated risk assessment score. In some implementations, updating the verification challenge can include replacing an image selected by the user in the user response with a replacement image. The replacement image can be determined based at least in part on the risk assessment score. For instance, the replacement image may be selected such that the replacement image meets the specified criterion or such that the replacement image does not meet the specified criterion.

In such implementations, whether or not the replacement image meets the specified criterion can be determined based at least in part on the risk assessment score corresponding to the user response. For instance, if the corresponding risk assessment score is less than a threshold, the replacement image can be selected such that the replacement image does not meet the specified criterion. In this manner, if the corresponding risk assessment score is greater than the threshold, the replacement image can be selected such that the replacement image does meet the specified criterion.

Figure 7:
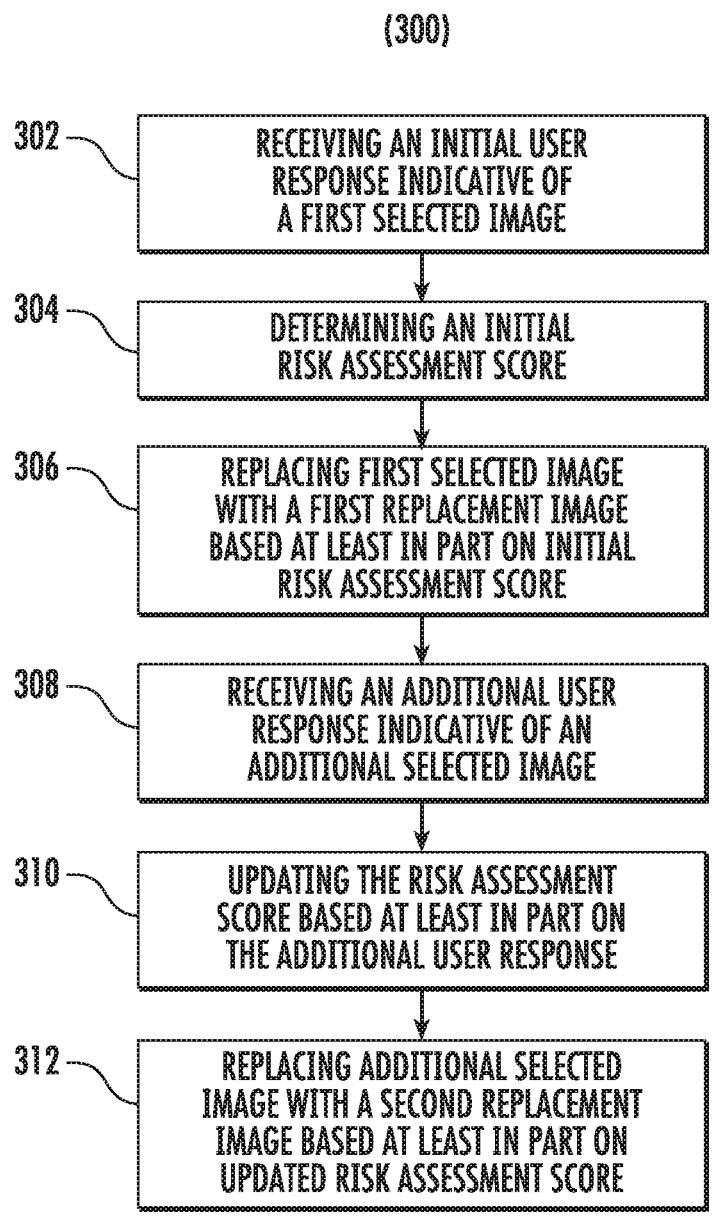
FIG. 7 depicts a flow diagram of an example method of updating a verification challenge according to example embodiments of the present disclosure.

FIG. 7 depicts a flow diagram of an example method (300) of dynamically updating a verification challenge presented to a user. For instance, at (302), method (300) can include receiving an initial user response to a verification challenge from a user device. The initial user response can be indicative of a first object (e.g. image) selected by the user.

At (304), method (300) can include determining an initial risk assessment score associated with the user and/or the user device. As indicated above, the initial risk assessment score can correspond to the initial user response.

At (306), method (300) can include replacing the first selected image with a first replacement image. The replacement image can be selected based at least in part on the initial risk assessment score. In particular, as indicated above, the replacement image can be selected to meet the specified criterion of the verification challenge or to not meet the specified criterion based at least in part initial risk assessment score.

At (308), method (300) can include receiving an additional user response indicative of an additional selected image. At (310), method (300) can include updating the risk assessment score based at least in part on the additional user response. For instance, the updated risk assessment score can be determined to reflect the additional user response. As an example, the updated risk assessment score may be different than the initial risk assessment score, or the updated risk assessment score may be the same as the initial risk assessment score.

At (312), method (300) can include replacing the additional selected image with a second replacement image based at least in part on the updated risk assessment score. In particular, the replacement image can be selected to meet the specified criterion of the verification challenge or to not meet the specified criterion based at least in part initial risk assessment score.

Figure 8:
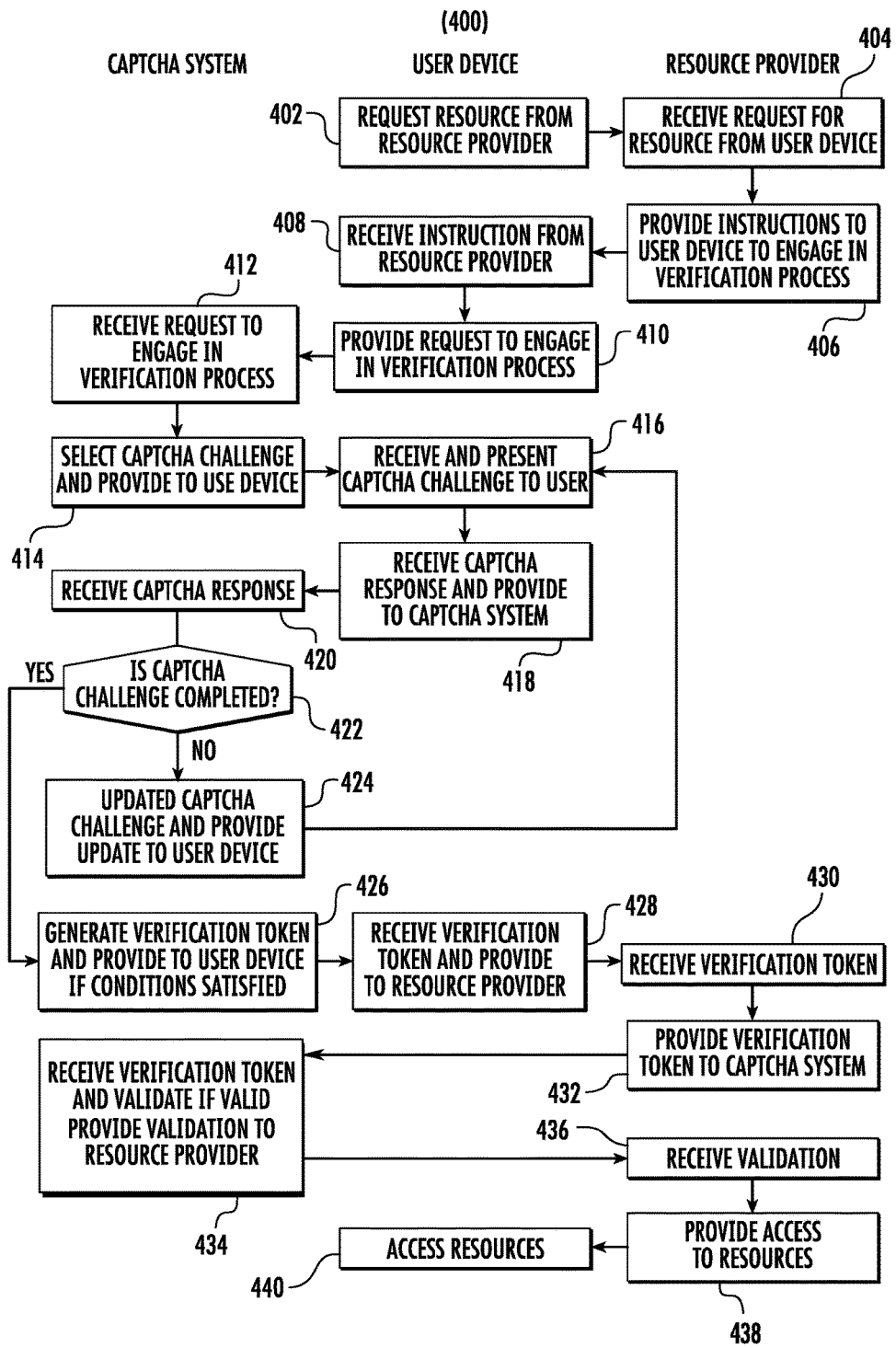
FIG. 8 depicts a flow diagram of an example method of verifying a user according to example embodiments of the present disclosure.

As indicated above, when the user has sufficiently solved the verification challenge, the user may be verified and granted access to the desired resource or service. For instance, FIG. 8 depicts a flow diagram of an example method (400) of verifying a user according to example embodiments of the present disclosure.

At (402) a user device can request a resource or access to an online service from a resource provider. At (404) the resource provider can receive the request from the user device.

At (406) the resource provider can instruct the user device to engage in a verification process directly with a computerized CAPTCHA system. At (408) the user device can receive the instructions from the resource provider to directly engage with the computerized CAPTCHA system. As an example, the resource provider can instruct the user device at (406) by redirecting a browser of the user device so that it directly connects with the computerized CAPTCHA system and begins the verification process.

As another example, at (406) the resource provider can provide the user device with a client-side script that, when executed by the user device, causes the user device to directly engage with the computerized CAPTCHA system. For example, the client-side script can be included in an inline frame, embedded object, portlet, or other embedded application or widget. In some implementations, the client-side script can be included in a plug-in provided from the computerized CAPTCHA system to the resource provider. Furthermore, in some implementations, at (406) the resource provider can provide the user device with a public key identifying the resource provider to the computerized CAPTCHA system.

At (410) the user device can transmit a request directly to the computerized CAPTCHA system to engage in a verification process. At (412) the computerized CAPTCHA system can receive the request from the user device.

As an example, the request transmitted at (410) can be formatted according to an application programming interface associated with the computerized CAPTCHA system. For example, the request can be transmitted as a result of executing a client-side script provided to the user device at (406). Furthermore, in some implementations, the request transmitted at (410) can include a public key associated with the resource provider.

At (414) the computerized CAPTCHA system can select a CAPTCHA challenge and provide the CAPTCHA challenge to the user device. In some implementations, the CAPTCHA challenge can include a plurality of selectable objects and one or more associated instructions prompting the user to select one or more of the objects in a specified manner. In some implementations, the CAPTCHA challenge can be selected based at least in part on a risk assessment score associated with the user and/or the user device.

In some implementations, at (414) a challenge format, challenge type, or other attributes of the challenge can be selected based on various other suitable factors. For example, in the instance that the user device is a mobile device, such as, for example, a smartphone or tablet, then at (414) the computerized CAPTCHA system can select a CAPTCHA challenge designed for a mobile device.

At (416) the user device can receive the CAPTCHA challenge from the computerized CAPTCHA system and present the CAPTCHA challenge to the user, for example, on a display of the user device. At (418) the user device can receive a response to the CAPTCHA challenge from the user and transmit the response to the computerized CAPTCHA system. At (420) the computerized CAPTCHA system can receive the response from the user device.

At (422), the computerized CAPTCHA system can determine whether the CAPTCHA challenge has been completed. As described above, the CAPTCHA challenge may require multiple user responses before the CAPTCHA challenge is completed. For instance, in implementations wherein the CAPTCHA challenge prompts the user to select each image that meets a criterion, the CAPTCHA challenge can be completed when each image that meets the criterion has been replaced by an image that does not meet the criterion. In some implementations, the determination of whether the CAPTCHA challenge is complete can be made responsive to a user input indicating that the CAPTCHA challenge is complete. For instance, the user may select a verification indicator prompting the CAPTCHA system to determine that the CAPTCHA challenge is complete.

If the CAPTCHA challenge has not been completed at (424) the CAPTCHA system can update the CAPTCHA challenge and provide the update to the user device. For instance, updating the CAPTCHA challenge may include replacing an image selected by the user with a replacement image based at least in part on a determined risk assessment score. In some implementations, the risk assessment score can be determined based at least in part on the user response to the CAPTCHA challenge. Once the CAPTCHA challenge has been updated, method (400) can return to (416). In this manner, one or more additional user responses can be input and provided to the CAPTCHA system until the CAPTCHA challenge has been completed.

Referring back to (422), if the CAPTCHA challenge has been completed, method (400) can proceed to (426). At (426) the computerized CAPTCHA system can generate a verification token and provide it to the user device if one or more verification conditions are satisfied. For instance, whether the conditions are satisfied can be determined based at least in part on the user response(s) to the CAPTCHA challenge and/or the risk assessment score(s) associated with the user. At (428) the user device can receive the verification token from the computerized CAPTCHA system.

As an example, the computerized CAPTCHA system can generate the verification token and provide it to the user device at (426) if the response received at (424) correctly solves or otherwise satisfies the CAPTCHA challenge. The verification token can be an authentication certificate or other security or authentication device or mechanism. For example, in some implementations, the verification token can include a hash of a user device identifier or other information or can incorporate the resource provider's public key.

It will be appreciated that, in some implementations, steps (410)-(426) can be considered a verification process. Further, in some implementations, steps (410)-(426) can occur via an inline frame, embedded object, portlet, or other embedded widget or application included in the resource provider's website.

At (428) the user device can provide the verification token to the resource provider. At (430) the resource provider can receive the verification token from the user device.

At (432) the resource provider can transmit the verification token to the computerized CAPTCHA system. In some implementations, at (432) the resource provider can also transmit its private key to the computerized CAPTCHA system together with the verification token.

At (434) the computerized CAPTCHA system can provide a validation of the verification token to the resource provider if the verification token is valid. If the verification token is invalid or has been tampered with, then the computerized CAPTCHA system can inform the resource provider that the verification token is invalid.

At (436) the resource provider can receive the validation of the verification token from the computerized CAPTCHA system. In response to receiving the validation at (436), at (438) the resource provider can provide the user device with access to the resource. At (440) the user device can access the resource.

Figure 9:
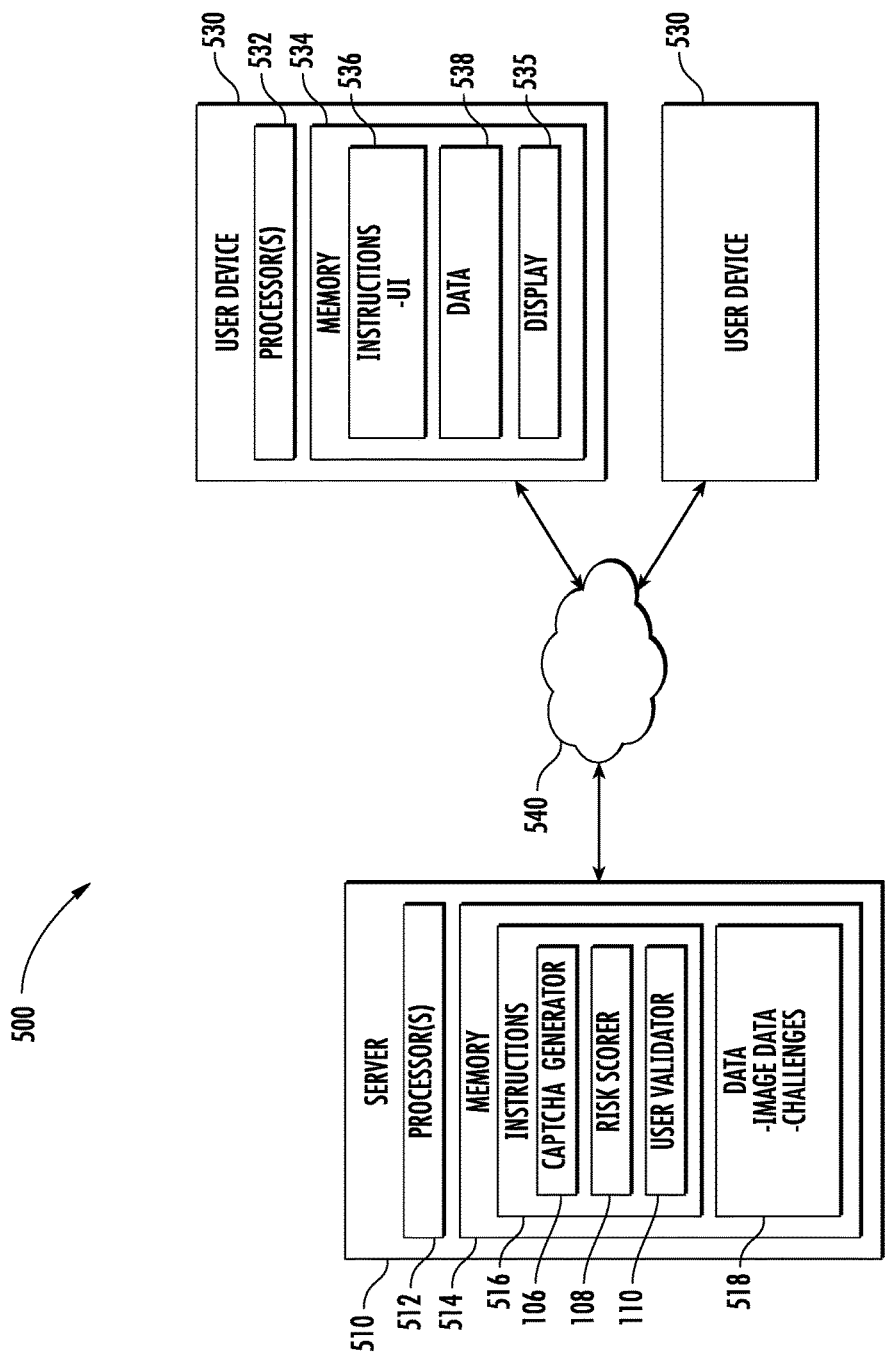
FIG. 9 depicts an example system according to example embodiments of the present disclosure.

FIG. 9 depicts an example computing system 500 that can be used to implement the methods and systems according to example aspects of the present disclosure. For instance, the system 500 can host a computerized CAPTCHA system. The system 500 can be implemented using a client-server architecture that includes a server 510 that communicates with one or more client devices 530 over a network 540. The system 500 can be implemented using other suitable architectures, such as a single computing device.

The system 500 includes a server 510, such as a web server. The server 510 can be implemented using any suitable computing device(s). The server 510 can have one or more processors 512 and one or more memory devices 514. The server 510 can also include a network interface used to communicate with one or more client devices (e.g. user devices) 530 over the network 540. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, or other suitable processing device. The one or more memory devices 514 can include one or more computer-readable media, including, but not limited to, non-transitory computer-readable media, RAM, ROM, hard drives, flash drives, or other memory devices. The one or more memory devices 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to implement CAPTCHA generator 106, risk scorer 108, and/or user validator 110 described with reference to FIG. 1.

As shown in FIG. 9, the one or more memory devices 514 can also store data 518 that can be retrieved, manipulated, created, or stored by the one or more processors 512. The data 518 can include, for instance, image data, CAPTCHA challenges, and other data. The data 518 can be stored in one or more databases. The one or more databases can be connected to the server 510 by a high bandwidth LAN or WAN, or can also be connected to server 510 through network 540. The one or more databases can be split up so that they are located in multiple locales.

The server 510 can exchange data with one or more client devices 530 over the network 540. Although two client devices 530 are illustrated in FIG. 9, any number of client devices 530 can be connected to the server 510 over the network 540. Each of the client devices 530 can be any suitable type of computing device, such as a general purpose computer, special purpose computer, laptop, desktop, mobile device, navigation system, smartphone, tablet, wearable computing device, a display with one or more processors, or other suitable computing device.

Similar to the server 510, a client device 530 can include one or more processor(s) 532 and a memory 534. The one or more processor(s) 532 can include one or more central processing units (CPUs), graphics processing units (GPUs) dedicated to efficiently rendering images or performing other specialized calculations, and/or other processing devices. The memory 534 can include one or more computer-readable media and can store information accessible by the one or more processors 532, including instructions 536 that can be executed by the one or more processors 532 and data 538. For instance, the memory 534 can store instructions 536 for implementing a user interface module for displaying CAPTCHA challenges determined according to example aspects of the present disclosure.

The client device 530 of FIG. 9 can include various input/output devices for providing and receiving information from a user, such as a touch screen, touch pad, data entry keys, speakers, and/or a microphone suitable for voice recognition. For instance, the client device 530 can have a display device 535 for presenting a user interface displaying CAPTCHA challenges according to example aspects of the present disclosure.

The client device 530 can also include a network interface used to communicate with one or more remote computing devices (e.g. server 510) over the network 540. The network interface can include any suitable components for interfacing with one more networks, including for example, transmitters, receivers, ports, controllers, antennas, or other suitable components.

The network 540 can be any type of communications network, such as a local area network (e.g. intranet), wide area network (e.g. Internet), cellular network, or some combination thereof. The network 540 can also include a direct connection between a client device 530 and the server 510. In general, communication between the server 510 and a client device 530 can be carried via network interface using any type of wired and/or wireless connection, using a variety of communication protocols (e.g. Transmission Control Protocol/Internet Protocol, Hypertext Transfer Protocol, Simple Mail Transfer Protocol, File Transfer Protocol), encodings or formats (e.g. Hypertext Markup Language, Extensible Markup Language) and/or protection schemes (e.g. Virtual Private Network, secure Hypertext Transfer Protocol, Secured Sockets Layer).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of dynamically updating a verification challenge, the method comprising:
receiving, by one or more computing devices, a request to access an online resource from a user device;

responsive to receiving the request to access the online resource, providing, by the one or more computing devices, a verification challenge to the user device, the verification challenge comprising a plurality of objects and one or more instructions prompting a user of the user device to interact with at least one object of the plurality of objects;

receiving, by the one or more computing devices, one or more user responses to the verification challenge, each user response corresponding to an interaction by the user with the at least one object from the plurality of objects; and determining, by the one or more computing devices, one or more risk assessment scores associated with the user of the user device based at least in part on the one or more user responses;

responsive to the one or more user responses, updating, by the one or more computing devices, the verification challenge based at least in part on the one or more user responses and the one or more risk assessment scores exceeding a risk assessment threshold, wherein updating the verification challenge comprises replacing, based at least in part on the one or more risk assessment scores, the at least one object with a replacement object, and wherein updating the verification challenge occurs prior to one or more subsequent user responses to the verification challenge.

2. The computer-implemented method of claim 1, further comprising determining, by the one or more computing devices, whether to grant the user access to the online resource based at least in part on the one or more user responses and the one or more risk assessment scores.

3. The computer-implemented method of claim 2, wherein the plurality of objects comprises a first subset comprising one or more objects that meet a criterion and a second subset of objects comprising one or more objects that do not meet the criterion.

4. The computer-implemented method of claim 2, wherein updating, by the one or more computing devices, the verification challenge comprises replacing, by the one or more computing devices, an object selected by the user with a replacement object.

5. The computer-implemented method of claim 4, wherein replacing, by the one or more computing devices, an object selected by the user with a replacement object comprises:
when the risk assessment score is less than a threshold, replacing, by the one or more computing devices, the object selected by the user with a replacement object that does not meet the criterion; and
when the risk assessment score is greater than the threshold, replacing, by the one or more computing devices, the object selected by the user with a second object that meets the criterion.

6. The computer-implemented method of claim 1, wherein each of the one or more risk assessment scores provides a measure of likelihood that the user is an illegitimate human user.

7. The computer-implemented method of claim 1, wherein the one or more instructions prompt the user to select each object from the plurality of objects that meets a criterion.

8. The computer-implemented method of claim 1, wherein the plurality of objects comprises a plurality of images.

9. The computer-implemented method of claim 1, wherein each risk assessment score is determined based at least in part on user device type, one or more user device capabilities, an Internet Protocol address associated with the user device, a user web-history, or whether the user participates in various other web-services.

10. The computer-implemented method of claim 1, wherein each risk assessment score is determined based at least in part on a percentage of user responses to the verification challenge that are correct.

11. The computer-implemented method of claim 1, wherein each risk assessment score is determined based at least in part on a length of time taken for a corresponding user response to be received.

12. The computer-implemented method of claim 1, wherein determining, by the one or more computing devices, one or more risk assessment scores comprises:
determining, by the one or more computing devices, a first risk assessment score; and
updating, by the one or more computing devices, the first risk assessment score to determine an updated risk assessment score.

13. The computer-implemented method of claim 1, wherein each of the one or more risk assessment scores corresponds to a user response.

14. The computer-implemented method of claim 1, wherein a greater number of the one or more user responses beyond a threshold number of the one or more user responses corresponds to an increase in the one or more risk assessment scores.

15. A computing system, comprising:
one or more processors; and
one or more memory devices, the one or more memory devices storing computer-readable instructions that when executed by the one or more processors cause the one or more processors to perform operations, the operations comprising:
receiving a request to access an online resource from a user device;
responsive to receiving the request to access the online resource, providing a verification challenge to the user device, the verification challenge comprising a plurality of objects and one or more instructions prompting a user of the user device to interact with at least one object of the plurality of objects;
receiving one or more user responses to the verification challenge, each user response corresponding to an interaction by the user with the at least one object from the plurality of objects; and
determining one or more risk assessment scores associated with the user of the user device based at least in part on the one or more user responses;
responsive to the one or more user responses, updating the verification challenge based at least in part on the one or more user responses and the one or more risk assessment scores exceeding a risk assessment threshold, wherein the updating comprises replacing the, wherein updating the verification challenge comprises replacing, based at least in part on the one or more risk assessment scores, the at least one object with a replacement object, and wherein updating the verification challenge occurs prior to one or more subsequent user responses to the verification challenge.

16. The computing system of claim 15, the operations further comprising determining whether to grant the user access to the online resource based at least in part on the one or more user responses and the one or more risk assessment scores.

17. The computing system of claim 15, wherein each of the one or more risk assessment scores provides a measure of likelihood that the user is an illegitimate human user.

18. One or more tangible, non-transitory computer-readable media storing computer-readable instructions that when executed by one or more processors cause the one or more processors to perform operations, the operations comprising:
- receiving a request to access an online resource from a user device;
- responsive to receiving the request to access the online resource, providing a verification challenge to the user device, the verification challenge comprising a plurality of objects and one or more instructions prompting a user of the user device to interact with at least one object of the plurality of objects;
- receiving one or more user responses to the verification challenge, each user response corresponding to an interaction by the user with the at least one object from the plurality of objects; and
- determining one or more risk assessment scores associated with the user of the user device based at least in part on the one or more user responses;
- responsive to the one or more user responses, updating the verification challenge based at least in part on the one or more user responses and the one or more risk assessment scores exceeding a risk assessment threshold, wherein updating the verification challenge comprises replacing, based at least in part on the one or more risk assessment scores, the at least one object with a replacement object, and wherein updating the verification challenge occurs prior to one or more subsequent user responses to the verification challenge.

19. The one or more tangible, non-transitory computer-readable media of claim 18, wherein each of the one or more risk assessment scores provides a measure of likelihood that the user is an illegitimate human user.

20. The one or more tangible, non-transitory computer-readable media of claim 19, wherein each risk assessment score is determined based at least in part on a percentage of user responses to the verification challenge that are correct or a length of time taken for a corresponding user response to be received.

* * * * *